US011370551B2

(12) United States Patent
Santin et al.

(10) Patent No.: US 11,370,551 B2
(45) Date of Patent: Jun. 28, 2022

(54) AIRCRAFT PROPULSION ASSEMBLY PROVIDED WITH A ROTARY TRANSFORMER FOR SUPPLYING THE BLADES WITH ELECTRICAL ENERGY

(71) Applicants: SAFRAN AIRCRAFT ENGINES, Paris (FR); SAFRAN ELECTRICAL & POWER, Blagnac (FR); SAFRAN TRANSMISSION SYSTEMS, Colombes (FR)

(72) Inventors: Mathieu Jean Jacques Santin, Moissy-Cramayel (FR); Guillaume Julien Beck, Moissy-Cramayel (FR); Aldric Renaud Gabriel Marie Moreau De Lizoreux, Moissy-Cramayel (FR); Boris Pierre Marcel Morelli, Moissy-Cramayel (FR); Jean-Michel Bernard Paul Chastagnier, Blagnac (FR); Thomas Turchi, Blagnac (FR)

(73) Assignees: SAFRAN AIRCRAFT ENGINES, Paris (FR); SAFRAN ELECTRICAL & POWER, Blagnac (FR); SAFRAN TRANSMISSION SYSTEMS, Colombes (FR)

( * ) Notice: Subject to any disclaimer, the term of this patent is extended or adjusted under 35 U.S.C. 154(b) by 64 days.

(21) Appl. No.: 17/051,587

(22) PCT Filed: Apr. 4, 2019

(86) PCT No.: PCT/FR2019/050795
§ 371 (c)(1),
(2) Date: Oct. 29, 2020

(87) PCT Pub. No.: WO2019/215399
PCT Pub. Date: Nov. 14, 2019

(65) Prior Publication Data
US 2021/0061479 A1 Mar. 4, 2021

(30) Foreign Application Priority Data

May 7, 2018 (FR) ..................................... 1853921

(51) Int. Cl.
*B64D 15/12* (2006.01)
*H01F 38/18* (2006.01)
(Continued)

(52) U.S. Cl.
CPC ................ *B64D 15/12* (2013.01); *B64C 7/00* (2013.01); *B64C 11/00* (2013.01); *B64D 27/10* (2013.01);
(Continued)

(58) Field of Classification Search
CPC ................................ B64D 15/12; H01F 38/18
See application file for complete search history.

(56) References Cited

U.S. PATENT DOCUMENTS 3,042,346 A * 7/1962 Hawley .................. B64D 15/12
174/69
3,535,618 A * 10/1970 Perrins .................... H01F 38/18
336/123
(Continued)

FOREIGN PATENT DOCUMENTS

EP 2730506 A2 5/2014
EP 2919555 A1 9/2015
(Continued)

OTHER PUBLICATIONS

Search Report dated Feb. 1, 2019, in FR Application No. 1853921 (2 pages).
(Continued)

*Primary Examiner* — Brian M O'Hara
(74) *Attorney, Agent, or Firm* — Bookoff McAndrews, PLLC

(57) ABSTRACT

A propulsion unit for an aircraft, including an engine and a propeller shaft and further a propeller with airfoils which is
(Continued)

coupled to the propeller shaft and having electrical members consuming electrical power, sealing between a case and the propeller shaft being ensured by a dynamic seal housed between a rotating dynamic seal support secured to the propeller shaft and a dynamic seal support flange secured to an end portion of the case, the rotating dynamic seal support being secured to the propeller shaft and abutted against a bearing for supporting this propeller shaft, it is provided that the propulsion unit, in order to deliver electrical power to the electrical members, having a rotating transformer rotated by the propeller shaft and including a stator, a casing of which is secured to the dynamic seal support flange and a rotor, a casing of which is secured to this propeller shaft.

10 Claims, 3 Drawing Sheets

(51) Int. Cl.
*B64C 7/00* (2006.01)
*B64C 11/00* (2006.01)
*B64D 27/10* (2006.01)
*B64D 27/16* (2006.01)
*B64D 27/24* (2006.01)

(52) U.S. Cl.
CPC ............. *B64D 27/16* (2013.01); *B64D 27/24* (2013.01); *B64D 2221/00* (2013.01)

(56) References Cited

U.S. PATENT DOCUMENTS

| | | | |
|---|---|---|---|
| 5,572,178 A | 11/1996 | Becker et al. | |
| 6,069,341 A * | 5/2000 | Gage | B64D 15/12 |
| | | | 310/239 |
| 6,137,082 A * | 10/2000 | Pruden | B64C 11/00 |
| | | | 310/239 |
| 9,638,044 B2 * | 5/2017 | Gieras | H05B 6/105 |
| 10,598,222 B2 * | 3/2020 | Devitt | F16C 32/0666 |
| 10,710,731 B2 * | 7/2020 | Santin | H01F 38/18 |
| 10,882,628 B2 * | 1/2021 | Abe | F16C 33/7846 |
| 11,047,312 B2 * | 6/2021 | Klonowski | H02K 7/1823 |

FOREIGN PATENT DOCUMENTS

| | | |
|---|---|---|
| FR | 863490 A | 4/1941 |
| WO | WO 2011/064377 A1 | 6/2011 |
| WO | WO 2013/167827 A1 | 11/2013 |
| WO | WO 2014/167830 A1 | 10/2014 |

OTHER PUBLICATIONS

International Search Report issued in International Application No. PCT/FR2019/050795 dated Jul. 17, 2019 (2 pages).

* cited by examiner

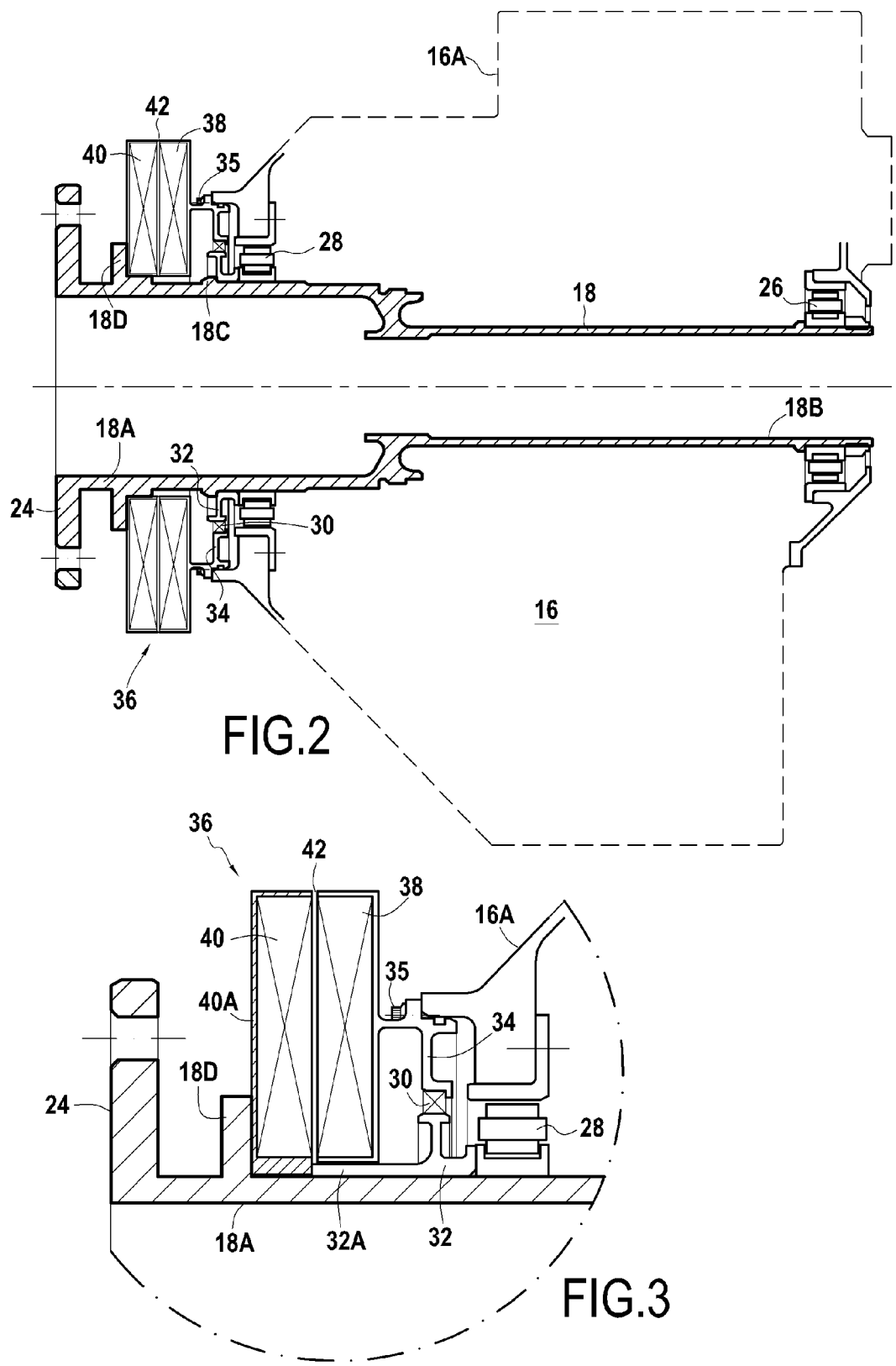

AIRCRAFT PROPULSION ASSEMBLY PROVIDED WITH A ROTARY TRANSFORMER FOR SUPPLYING THE BLADES WITH ELECTRICAL ENERGY

CROSS-REFERENCE TO RELATED APPLICATIONS

This application is the U.S. national phase entry under 35 U.S.C. § 371 of International Application No. PCT/FR2019/050795, filed on Apr. 4, 2019, which claims priority to French Patent Application No. 1853921, filed on May 7, 2018.

BACKGROUND OF THE INVENTION

On a conventional turboprop, the propeller is driven by a gas turbine (free turbine or linked turbine) via a reduction gear, the reduction gear placed between the propeller and the turbomachine can be of different types: with a simple gear train, with a compound gear train, harmonic drive, epicyclic, etc. Likewise, on a conventional helicopter, the main rotor which includes the airfoils of the helicopter is also driven by a gas turbine via a reduction gear consisting of a main gearbox (MGB).

The propeller fitted to such a turboprop, as well as the main rotor of a helicopter, are generally equipped with a de-icing system allowing taking off the ice accumulating on the airfoils of the propeller or of the main rotor. Most of the current de-icing systems are electrical systems including, for example, electric heating mats fixed onto the intrados and the extrados of each airfoil, at the leading edge, which, when supplied with energy, will create heat allowing taking off the ice formed on the airfoil, which will then be ejected by centrifugation. This energy supply to the heating mats requires a power of several kilowatts delivered by a three-phase AC network, the single-phase AC or low-voltage DC supplies being indeed reserved for lower power charges.

To do so, it is necessary to supply electrical energy to the mats fixed onto the airfoils, via equipment allowing transferring this electrical energy from a stationary portion in the engine to a rotating portion, the propeller or the main rotor.

Conventionally, this rotating transfer of the electrical energy is carried out using a "brushes+collector" system. On a conventional turboprop, the transfer is carried out by contact between the collector mounted on the rear cowl of the propeller and made up of one or several track(s) made of conductive material, typically copper, and the brushes mounted on the reduction gear of the engine and made of a conductive material rubbing on the copper track(s). A variant of this mounting is illustrated by patent EP2730506 issued to the American company Hamilton Sundstrand, with a mounting of the equipment necessary for the rotating transfer (brushes and collector) at the rear of the reduction gear and not between the reduction gear and the propeller as carried out conventionally.

However, this solution has many drawbacks mainly related to the friction of the brushes on the tracks of the collector, which is a significant source of wear of these brushes. This rapid wear therefore requires regular maintenance then replacement operations, but the lack of knowledge of the actual service life of the brushes has the consequence of making the system unreliable.

In addition, the brushes are exposed to oil projections, dust particles (including external particles such as sand, etc.) that can generate electric arcs at the contact likely to initiate the combustion of flammable elements constituting the rear panel of the propeller (which may contain magnesium) and cause incipient fire that could lead to the loss of the turbomachine.

Also, it is known from U.S. Pat. No. 5,572,178 to integrate a single-phase rotating transformer on the drive shaft of an aircraft, in order to achieve a contactless rotating transfer to supply an electrothermal or electromechanical de-icing system of low or medium power (from 300 W to 500 W per airfoil). However, such a solution is not suitable in the case of purely electrical systems requiring electrical power transfers on the order of 1 kW per airfoil and it would be therefore necessary to use a three-phase transformer which consists conventionally of three single-phase rotating transformers disposed side by side but with the following drawbacks:

the three-phase transformer thus constituted would be bulky in length, making it difficult to integrate on a shaft of the turbomachine without modifying its dimensions, which would have an overall impact on the length of the engine (involving an increase in mass and difficulties in integration on the aircraft), the mass of such a transformer would be necessarily high, and it would increase with the inner diameter thereof, and mounted at the end of the shaft therefore in a cantilevered manner on a shaft that can undergo significant forces, the addition of such a transformer would complicate the dynamics of the shaft line necessary to guarantee a small air gap, typically less than 1 mm, over the entire length of this transformer.

OBJECT AND SUMMARY OF THE INVENTION

The invention therefore aims at proposing an integration of a rotating transformer in a propulsion unit for an aircraft which allows a contactless transfer of a significant electrical power to a propeller with airfoils which is driven by an engine of the propulsion unit, for example to ensure the de-icing of the airfoils of the propeller, and requires little or no structural modifications. A common name of a propeller with airfoils is used to describe both the propeller of an aircraft and the main rotor of a helicopter, or a main rotor of a flying drone, the propeller shaft or the shaft of the main rotor being described in the same way as a propeller shaft.

This aim is achieved thanks to a propulsion unit for an aircraft, including an engine and a propeller shaft driven in rotation by the engine, said propeller shaft passing through a sealed case containing a lubricating fluid, the propulsion unit further including a propeller with airfoils which is coupled to said propeller shaft and comprising electrical members that are electrical power consumers, the sealing between said sealed case and said propeller shaft being ensured by a dynamic seal housed between a rotating dynamic seal support angularly secured to said propeller shaft and a dynamic seal support flange secured to an end portion of said case facing said propeller, said rotating dynamic seal support being secured to said propeller shaft while being axially held in abutment against a bearing for supporting said propeller shaft, the propulsion unit being characterized in that, in order to deliver electrical power to said electrical members, it comprises a rotating transformer rotated by said propeller shaft and including on the one hand a stator, a casing of which is secured to said dynamic seal support flange and on the other hand a rotor, a casing of which is secured to said propeller shaft.

Thus, by integrating the transformer directly at the level of the dynamic seal support flange in connection with the propeller shaft, the structural modifications of the turbomachine as well as the forces supported by the transformer are limited. The transformer advantageously has a reduced air gap ensuring sufficient compactness for this integration.

Advantageously, said stationary portion of the turbomachine is an end portion of said reduction gear opposite to said propeller.

Preferably, said stator casing is integrated into said dynamic seal support flange to form one and the same part.

Advantageously, said dynamic seal support flange is secured to said case end portion either by a plurality of screws or by a tightening collar.

According to one embodiment, said rotor casing is integrated into said rotating dynamic seal support to form one and the same part and said rotor casing is disposed in a cantilevered manner on a shoulder of said propeller shaft, so that by only resting on a small length of the propeller shaft, it does not follow its bending movements. Said rotating dynamic seal support is clamped between said shoulder of said propeller shaft and the bearing for supporting said propeller shaft.

According to another embodiment, said rotor casing is secured to said propeller shaft by clamping between a shoulder of said propeller shaft and said rotating dynamic seal support.

Advantageously, said electrical members each include one or several electrical de-icing element(s) and said electrical power is delivered to said propeller with airfoils for supplying said electrical de-icing elements.

The invention in particular finds application on a turboprop or an aircraft turbofan turbojet engine, a helicopter turboshaft engine or a flying drone electric motor.

BRIEF DESCRIPTION OF THE DRAWINGS

Other characteristics and advantages of the invention will emerge from the following description of particular embodiments of the invention, given by way of non-limiting examples, with reference to the appended drawings, in which.

DETAILED DESCRIPTION OF EMBODIMENTS

The principle of the invention is based on a particular integration into a gearbox or an aeronautical turbomachine reduction gear of a rotating three-phase transformer with radial flow of the "U" type (called TFU in the remainder of the document) or with axial flow of the "E" type (called TFE in the remainder of the document) as described for example in applications WO2013/167827 to WO2014/167830 whose content is incorporated by reference, for the transfer of electrical power to a turbomachine propeller or a helicopter rotor and allowing, for the same electrical power, a gain in mass and bulk compared to a conventional three-phase transformer.

By "aeronautical turbomachine", it should be meant a turboprop or an aircraft turbojet engine, a helicopter turboshaft engine or an aircraft turbofan preferably with a high bypass ratio.

Figure 1A:
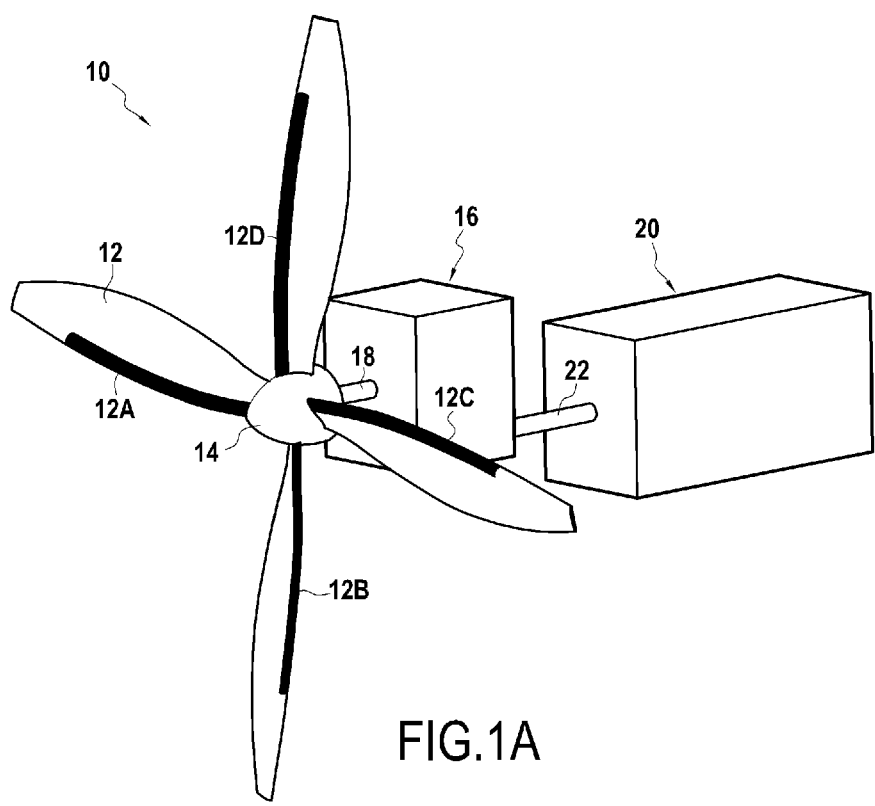
FIG. 1A is a perspective view schematizing a first example of an aeronautical turbomachine allowing an implementation according to the invention.

As shown schematically in FIG. 1A relating to an aircraft turboprop, a propeller 10 including a plurality of airfoils 12 arranged around a hub 14 and each including one or several electrical de-icing element(s) 12A to 12D, is connected to a reduction gear 16 via a propeller shaft 18. The reduction gear is in turn connected to a gas turbine engine 20 of the aeronautical turbomachine via a drive shaft 22. The reduction gear ensures the speed conversion between the propeller disposed in front of the reduction gear and which rotates at a determined speed and the gas turbine engine mounted at the rear of the reduction gear and which rotates at a much higher speed.

Figure 1B:
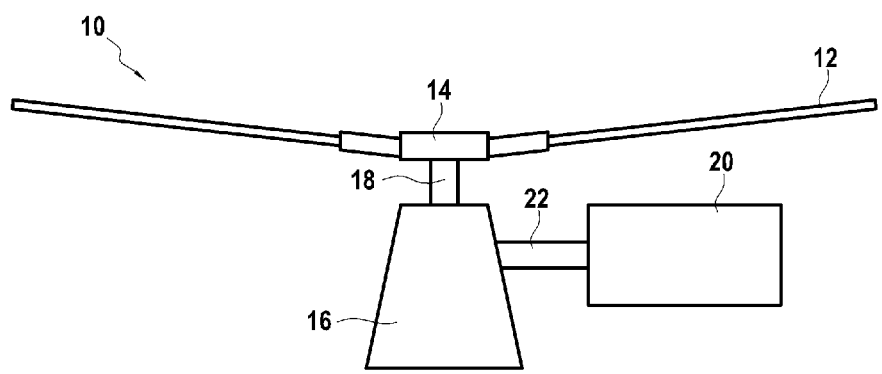
FIG. 1B is a schematic view of a second example of an aeronautical turbomachine allowing an implementation according to the invention, FIG. 2 very schematically illustrates the integration of an axial flow rotating transformer on a shaft of the turbomachine of FIG. 1A, FIG. 3 very schematically illustrates a variant of integration of an axial flow rotating transformer on a shaft of the turbomachine of FIG. 1A.

Almost the same elements have the same references in FIG. 1B relating to a helicopter turboshaft engine. A main helicopter rotor 10 including a plurality of airfoils 12 arranged around a central body 14 is connected to a gearbox 16 via a rotor shaft 18. The gearbox which consists of a reduction gear with a large reduction ratio is connected in turn to a gas turbine engine 20 of the aeronautical turbomachine via a drive shaft 22. The gearbox 16 ensures the speed conversion between the rotor which rotates at a determined speed and the gas turbine engine which rotates at a much higher speed.

In FIG. 2 which relates more particularly to an aircraft turboprop (but without this example being limiting), the propeller shaft 18 shown in more detail (however without the different electrical wirings of connection to the de-icing elements and to the electrical power supply which have not been represented in order not to overload the drawing) and including in particular at one end of its front portion 18A a flange 24 for fixing to the propeller 10, is supported in the reduction gear 16 through which it passes by a pair of bearings 26, 28, for example rolling bearings of the roll type, this reduction gear being enclosed in a sealed case 16A containing a lubricating fluid. A third bearing (not represented in the drawing) of the ball bearing type can complete the pair of bearings 26, 28 to take up the axial force of the propeller. The propeller shaft generally has in this front portion (without this configuration being considered as limiting) a diameter greater than the diameter of a rear portion 18B. The dynamic sealing between the stationary reduction gear 16 and the rotating propeller shaft 18 is conventionally ensured by a dynamic seal 30 housed between a rotating dynamic seal support 32 angularly secured to the propeller shaft 18 and a dynamic seal support flange 34 secured to the case of the reduction gear 16A. The rotating dynamic seal support is secured to the propeller shaft while being axially held in abutment against the bearing 28 for supporting the propeller shaft.

More specifically, in the embodiment represented in FIG. 2, the rotating dynamic seal support 32 is clamped between a shoulder 18C of the propeller shaft and the bearing 28, for example by means of an abutment device (not represented) provided for axially pressing on the bearing 28 in the direction of the shoulder 18C. This abutment device may for example comprise a nut in abutment against the bearing 28 and a rolling element bearing which can be provided at this location of the propeller shaft. The dynamic seal support flange is for its part fixed to the case of the reduction gear advantageously by a plurality of screws 35.

According to a first embodiment of the invention, in order to deliver the electrical power necessary for supplying the electrical de-icing element(s), it is proposed to place the axial flow rotating transformer (TFE36) on this propeller shaft passing through the reduction gear, at the output of this reduction gear (that is to say in front of the propeller shaft, on the propeller side), between the flange 24 for fixing to the propeller and the case 16A of the reduction gear. This location is chosen rather than any other since it is present on most current reduction gear configurations since the length of the propeller shaft is conventionally constrained by the integration at this location of the "brushes+collector" system of the art prior. The transformer 36, by fitting into this available space instead of this conventional system, therefore does not require the release of an additional free volume and, depending on the dimensions of the transformer used, it becomes even possible to reduce the distance between the propeller fixing flange and the case of the reduction gear to reduce, if necessary, the mass of the new assembly thus constituted.

In this first configuration, the stator 38 of the transformer is secured to the reduction gear 16 and the rotor 40 is secured to the propeller shaft 18, a small axial air gap 42, typically less than 1 mm, being arranged between the stator and the rotor. More specifically, the stator 38 is secured to the dynamic seal support flange 34 fixed to the case of the reduction gear by the plurality of screws 35 and which is modified to also serve as a support for a casing of this stator and thus form with the latter one and the same part 34. In the example illustrated, the rotor 40 is on the other hand simply mounted in a casing 40A shrink-fitted onto the propeller shaft against a shoulder 18D of this propeller shaft.

This fixing of the rotor is of course in no way limiting and in the example of FIG. 3, the casing 40A of the rotor 40 is secured to the propeller shaft by clamping between this shoulder 18D and the rotating dynamic seal support 32, which is then extended axially by a tubular portion 32A, one end of which is in abutment against the casing 40A.

The advantages provided by this solution allowing the integration of the axial flow transformer on the propeller shaft closer to the reduction gear (and in particular to the bearing 28 for supporting the propeller shaft) are in particular the following:

A space saving due to integration into the dynamic sealing system of the reduction gear, A cantilever of the reduced propeller shaft and a decrease in the impact on the dynamics of the line of the propeller shaft, A mass gain because the configuration limits the number of intermediate parts necessary to fix the transformer, and A limitation of the air gap variations facilitated by the axial flow mounting which is also less sensitive to the bending effects in the propeller shaft.

In addition, the transformer is no longer a piece of equipment mounted on the reduction gear, but becomes an integral part thereof, and therefore assembled at the same time as the reduction gear.

Figure 4:
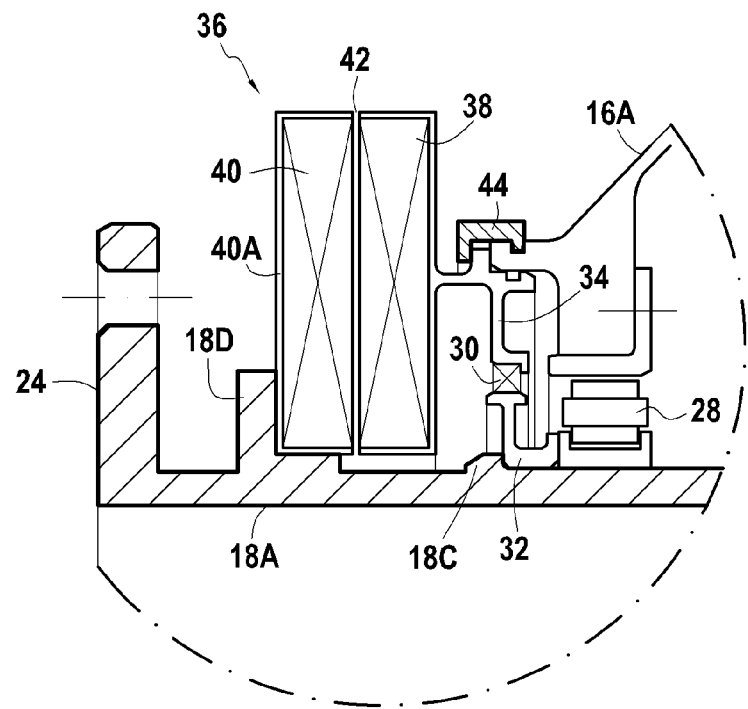
FIG. 4 shows a detail of a collar assembly of the transformer of FIG. 2, and FIG. 5 very schematically illustrates the integration of a radial flow rotating transformer on a shaft of the turbomachine of FIG. 1A.

As shown in the variant of FIG. 4, the dynamic seal support flange 34 supporting the stator can also be assembled to the case by a means other than fixing by screws 35. For example, a collar 44 assembly solution allows reducing space requirement and bringing the stator and the rotor closer to the bearing 28, which limits their deflections in operation.

Figure 5:
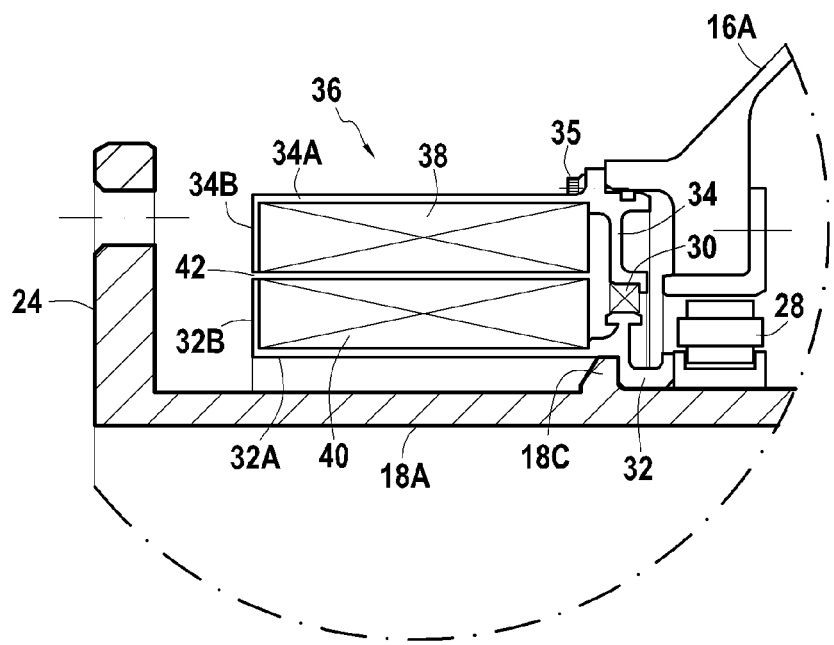

FIG. 5 schematically illustrates (the electrical wiring having similarly been omitted) the integration of a TFU radial flux rotating transformer on the propeller shaft 18 at the output of the reduction gear.

Similarly to the previous embodiment, the dynamic seal support flange 34 is modified by being extended by an axial circumferential wall 34A terminated by a radial return wall 34B to also form the casing of the stator 38 of the transformer, the assembly then constituting one and the same part. On the other hand, in this second embodiment, the rotating dynamic seal support 32 is extended in turn by an axial circumferential wall 32A terminated by a radial return wall 32B to form a casing of the rotor, the assembly constituting one and the same part held axially by clamping between the shoulder 18C of the propeller shaft 18 and the bearing 28 for supporting the propeller shaft 18. In this way, the rotor cantilevered on this shoulder rests on a small length of the propeller shaft in an area which is located closer to the roller bearing of the bearing 28 taking up the forces of the propeller shaft 18.

The advantages provided by this configuration of a TFU allowing the integration on the propeller shaft 18 are multiple and in addition to the aforementioned advantages of space saving and mass gain and of a reduced propeller shaft cantilever, this radial flux configuration allows decoupling the rotor 40 of the transformer from the propeller bending movements in order to limit the air gap variations. Indeed, the rotor does not rest directly over the entire length available of the propeller shaft and is therefore not "driven" by the bending movements of this shaft.

In the embodiments described above, the propeller shaft 18 is formed integrally. It is nevertheless possible to provide for a propeller shaft produced in at least two portions, with for example an external portion called "attached flange" comprising the propeller fixing flange 24, this external portion being mounted secured in rotation to an internal portion that carries the rotating dynamic seal support 32 and the bearing 28 for supporting the shaft. A shoulder can be provided on the internal portion of the shaft to form a stop against which the attached flange can be tightened by a nut, and this nut can clamp the rotating dynamic seal support between the attached flange and the shoulder. This embodiment allows in particular a replacement of the rotating transformer, in the event of an electrical fault, without requiring complete removal of the reduction gear, but only by withdrawing the propeller and the attached flange, thus facilitating maintenance operations.

With the invention, integration onto the propeller shaft at the output of the reduction gear is proposed to optimize the space requirement and mass of the TFU and TFE transformer. However, it will be noted that if the aforementioned integration is preferably based on technologies of transformers called "U" or "E" transformers as described in the applications WO2013/167827 to WO2014/167830, it is clear that they are also applicable for any type of polyphase axial or radial flux transformer.

It should also be noted that if the foregoing description has been made essentially with regard to an aircraft propulsion unit as represented in FIG. 1A, it is understood that those skilled in the art will have no difficulty in implementing the invention in the propulsion unit of a helicopter illustrated in FIG. 1B and in which the sealed case of the main gearbox (including a reduction gear able to drive the main rotor of the helicopter) is similar to the aforementioned sealed case. In the same way, the implementation of the invention at the shaft of the main rotor of the helicopter is similar to the one described previously at the propeller shaft of the aircraft.

Likewise, those skilled in the art will be able, without inventiveness effort, to take as a sealed case the sealed case of an electric motor of a flying drone and as a propeller shaft the output shaft of this motor ensuring a direct driving of the propellers (its propeller with airfoils) of this flying drone.

It will also be noted that, if the present invention has been developed within the framework of the rotating electrical transfer for the supply of a propeller airfoil de-icing system, it is of course also applicable to all electrical members that are electrical power consumers and therefore requiring a rotating transfer of electrical energy to a propeller with airfoils regardless of its use. These electrical members can be in this way and without limitation: a propeller pitch actuation system, a propeller balancing system, a measuring system on the rotating portion, for example.

The invention claimed is:

1. A propulsion unit for an aircraft, including an engine and a propeller shaft driven in rotation by the engine, said propeller shaft passing through a sealed case containing a lubricating fluid, the propulsion unit further including a propeller with airfoils which is coupled to said propeller shaft and comprising electrical members that are electrical power consumers, the sealing between said sealed case and said propeller shaft being ensured by a dynamic seal housed between a rotating dynamic seal support angularly secured to said propeller shaft and a dynamic seal support flange secured to an end portion of said case facing said propeller, said rotating dynamic seal support being secured to said propeller shaft while being axially held in abutment against a bearing or supporting said propeller shaft, the propulsion unit being characterized in that, in order to deliver electrical power to said electrical members, it comprises a rotating transformer rotated by said propeller shaft and including on the one hand a stator, a casing of the stator being secured to said dynamic seal support flange and on the other hand a rotor, a casing of the rotor being secured to said propeller shaft.

2. The propulsion unit for an aircraft according to claim 1, wherein said stator casing is integrated into said dynamic seal support flange to form one and the same part.

3. The propulsion unit for an aircraft according to claim 1, wherein said dynamic seal support flange is secured to said case end portion by a plurality of screws.

4. The propulsion unit for an aircraft according to claim 1, wherein said dynamic seal support flange is secured to said case end portion by a tightening collar.

5. The propulsion unit for an aircraft according to claim 1, wherein said rotor casing is integrated into said rotating dynamic seal support to form one and the same part.

6. The propulsion unit for an aircraft according to claim 5, wherein said rotor casing is disposed in a cantilevered manner on a shoulder of said propeller shaft, so that by only resting on a small length of the propeller shaft, the rotor casing does not follow bending movements of the propeller shaft.

7. The propulsion unit for an aircraft according to claim 6, wherein said rotating dynamic seal support is clamped between said shoulder of said propeller shaft and the bearing for supporting said propeller shaft.

8. The propulsion unit for an aircraft according to claim 1, wherein said rotor casing is secured to said propeller shaft by clamping between a shoulder said propeller shaft and said rotating dynamic seal support.

9. The propulsion unit for an aircraft according to claim 1, wherein said electrical members comprise one or several electrical de-icing element(s) and said electrical power is delivered to said propeller with airfoils for supplying said electrical de-icing elements.

10. The propulsion unit for an aircraft according to claim 1, wherein said engine consists of a turboprop or an aircraft turbofan turbojet engine, a helicopter turboshaft engine or a flying drone electric motor.

* * * * *